Jan. 2, 1962  C. J. SHUTTLEWORTH ETAL  3,015,228

AIR QUALITY GAUGE

Filed Sept. 12, 1955

*INVENTORS*
CORNELIUS J. SHUTTLEWORTH
THOMAS A. McCONNELL
BY
Whittemore, Hulbert
Belknap
ATTORNEYS

United States Patent Office 3,015,228
Patented Jan. 2, 1962

3,015,228
AIR QUALITY GAUGE
Cornelius J. Shuttleworth, 14248 Appoline, Detroit 27, Mich., and Thomas A. McConnell, 660 Burroughs, Plymouth, Mich.
Filed Sept. 12, 1955, Ser. No. 533,598
1 Claim. (Cl. 73—29)

The present invention relates to an improved gauge or indicator device to enable a determination to be made as to the quality of compressed air or other gas in respect to the presence therein of another vaporous entrained liquid other than water. The device also facilitates and expedites the making of a quantitative analysis as to any such substance, if desired.

It is a general object of the invention to provide an improved gauging or indicating device of this character which is simple and relatively inexpensive, yet which affords a means to derive an unadulterated sample of the foreign substance suspected in a pressurized gas, as to which substance qualitative and/or quantitative analyses may then be made both visually and by known weight and/or extraction methods. To this end, the sample is taken in an entirely enclosed expansion chamber of the gauge, precluding escape of the entrained vapor or adulteration of the gas by foreign matter.

Another general object is to provide a novel and improved apparatus for the purpose of determining the quality of a gas in regard to a liquid entrained therein as a vapor which may be incapable of mechanical entrapment in its vaporous form, said method and apparatus featuring the sudden and violent or extreme expansion of the vapor-burdened gas to change the state of its entrained vapor into liquid form, and for thereafter confining and collecting the liquid or globulized gas and determining in one way or another its quality. It is thus possible to accurately and reliably assess a vaporous gas of more or less perfect gaseous character, in which the entrained vapor is, as vapor, quite impossible of mechanical entrapment, being in fact capable of permeating piping, valving, etc., by the expansion and globulization principle of the invention.

A further object of the invention is to provide a structurally simple gauge of this character which may also be used as a positively functioning instrumentality in a compressed gas system. As an example, an installation of the gauge as a component of a compressed air actuated tool, or on a pressure vessel supplying a number of such tools, is contemplated. Lubricant is commonly added to the compressed air supply for the tool, and the device thus will afford a check of the amount of lubricant at the tool.

Yet another and more specific object of the invention is to provide an indicator device of the sort referred to above which features an intake plenum or pressure space in communication with a housing defining an expansion chamber, there being a pressure gauge applied to the plenum space so that the pressure of air or other gas may be directly read. An appropriate gas-permeable membrane is supported in the expansion chamber to be exposed to the air or gas entering this chamber, the gas passing through the membrane after expansion and leaving entrained oil or other material on the membrane. The gas is then voided to atmosphere, or discharged to a suitable receiver, in the event it is a noxious or expensive one. Provision is made whereby the membrane may be readily and quickly removed from the housing for examination and/or analysis of its deposit in any of the ways mentioned above.

Still more specifically, it is an object to provide a quality test gauge or indicator in which the gas enters the expansion chamber through a metering opening of very small diameter and is caused to expand suddenly and greatly by orifice action, as well as to be dispersed and rendered turbulent in the expansion chamber. This enables the less perfect gases, of which an oil vapor is an example, to undergo a change of state and convert their oil content to minute liquid globules. In this condition, the gas passes through a permeable membrane or filter paper supported in the expansion chamber by means of a perforated backing plate. Upon deposition of the oil or other particles on the paper in this manner, the gas is discharged from an exhaust chamber on the down stream side of the membrane-plate unit, either to atmosphere or to a receiver as mentioned above. The action is a continuous one over a time interval of testing which is of substantial duration, from the initial supplying of the gas under pressure to the orifice through its voiding downstream of the membrane.

Another specific object is to provide a device of the foregoing character, in which the use of metering orifices of different sizes is possible and practical, so that the device has considerable versatility in regard to the types of gases containing entrained, non-aqueous vapor which may be analysed by its assistance, the degree of relative expansion of the gas which takes place through the metering orifice, the degree to which the entrained fluid is globulized, etc.

The foregoing as well as other objects will become more apparent as this description proceeds, especially in connection with the accompanying drawings.

Figure 1:
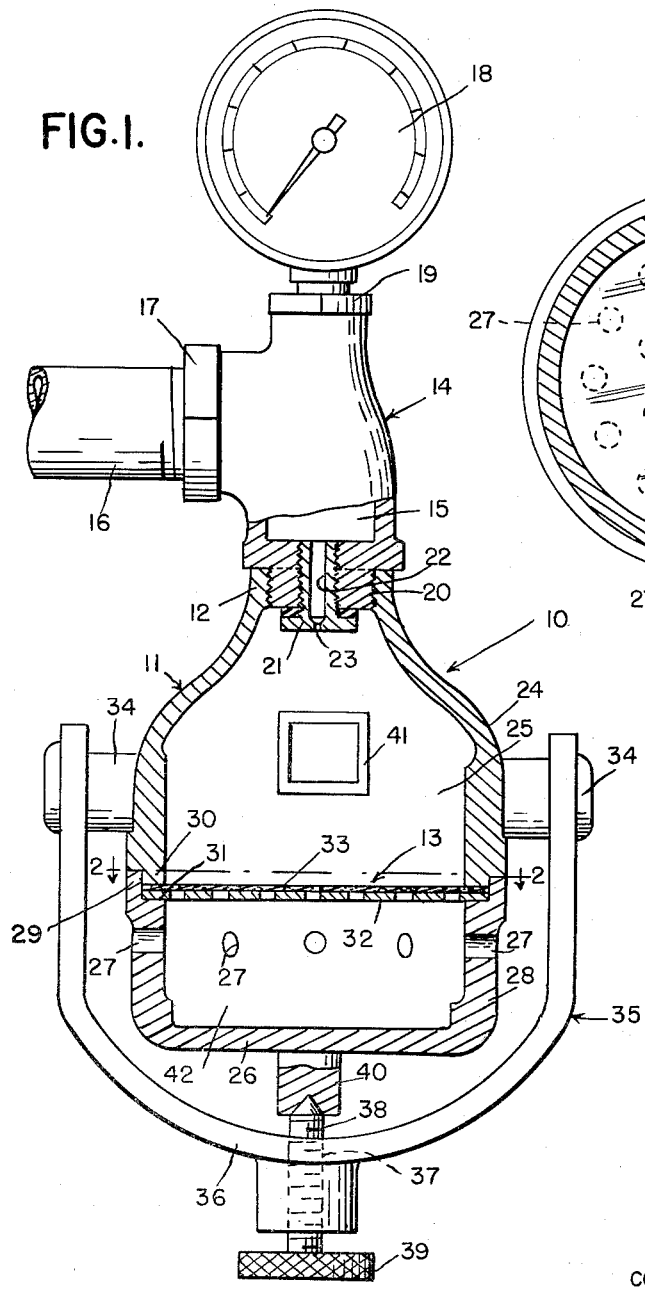
FIG. 1 is a fragmentary view in elevation, partially broken away and in vertical central section, illustrating structural details of the improved quality gauge.
Figure 2:
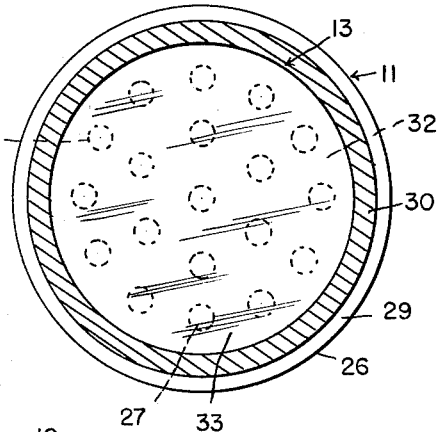
FIG. 2 is a view in horizontal section along line 2—2 of FIG. 1.

The improved gauge 10 of the invention comprises a housing 11 of substantial size, cylindrical in cross section and tapering upwardly to a central throat 12, which housing is internally subdivided by a transverse diaphragm-like membrane and plate unit, generally designated 13, which will be hereinafter described as to its composition and arrangement in the housing 11.

The reference numeral 14 designates an intake manifold type of fitting which is fixedly secured to the throat 12 of housing 11 and affords a plenum chamber 15 to which air to be tested or other gas is admitted through a pipe 16 tapped into an intake port 17 of the fitting 14. A conventional calibrated pressure gauge 18 is threadedly attached to another port 19 of the fitting 14, the pressure in the line or pipe 16 and in plenum chamber 15 being directly readable in pounds per square inch from gauge 18.

The gas to be tested by the use of the device 10 may be compressed air likely to contain an entrained liquid, such as oil, derived from a compressor, as well as particles of foreign matter. However, the utility of the device is not particularly limited in this respect. For example, it may be used in testing the contents of cylinders of compressed hydrogen, in which certain non-petroleum type, oily or non-oily substances, may have been entrained in the processing or storage of the gas. The mode of using the device 10 will be the same, in any case, with the qualification that when a noxious and/or expensive gas such as hydrogen, chlorine, or the like is handled, provisions will naturally be made to prevent its escape to atmosphere, as will be described.

A centrally apertured adapter plug 20 is fixedly threaded into the throat 12 of housing 11, in gas-tight relation thereto. This plug is preferably unitarily connected to the lower extremity of the plenum fitting 14, but structural details in this regard are unimportant to the invention, except that a well sealed union is essential. A tubular metering orifice element 21 is in turn threaded into the central aperture of plug 20. Element 21 has a central passage 22 opening to plenum chamber 15, which passage is simply constituted by a drilled bore of the tubular metering element, narrowing to a very restricted metering orifice 23 through which the pressurized gas in chamber 15 is discharged into the housing 11.

This discharge is accompanied by an immediate expansion of the gas, as well as by a turbulence which effects globulization of the gas in the manner referred to above.

The housing 11 is constituted by an upper, bell-like bonnet 24 which tapers upwardly to the throat 12 and affords an expansion chamber 25 of substantial volume into which the metering orifice 23 discharges. The lower housing part is a cup-like member 26, of substantial internal volume, which is provided with a series of exhaust ports or apertures 27 about its upstanding peripheral wall 28. The upper extremity of cup member 26 is in the form of an annular flange 29 into which a mating internal annular shoulder 30 of the upper bonnet 24 nests. An annular shoulder 31 inwardly of flange 29 supports a perforated circular disc 32, which in turn serves as a support for a test membrane or filter paper 33. The shoulder 30 of bonnet 24 serves to clamp the paper 33 and the perforated disc 32 firmly against shoulder 31, in a well sealed condition.

Bonnet 24 is provided with a pair of diametrically opposed, outwardly extending trunnions 34 which pivotally receive the arms of a clamping yoke 35. This yoke is provided at the center of its cross piece 36 with a threaded aperture 37 which receives a conical ended clamp screw 38 provided with a knurled finger piece 39 for its threading manipulation. Clamp screw 38 is received in a conical recess of a boss 40 affixed to the bottom of the cup 26.

Accordingly, upon a simple releasing of the screw 38 from boss 40 by unscrewing finger piece 39, the clamping yoke 35 may be swung out of the way to one side, whereupon the lower cup 26 falls readily away from the upper bonnet 24, leaving the filter membrane or paper 33 exposed for visual inspection, or for removal and analysis by other methods. If desired, the bonnet 24 may be constructed of a suitable rigid transparent material, or equipped with one or more windows 41, to permit observation of the progress of the test.

Figure 3:
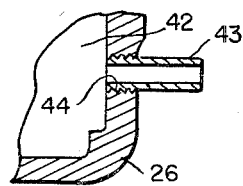
FIG. 3 is a fragmentary view illustrating a modification in the construction of part of a gauge component, for use in the event it is not desired to void the gauged gas to atmosphere.

An alternative embodiment of the invention is illustrated in FIG. 3, which simply involves the provision of a lower cup 26 by which the gas leaving a receiving chamber 42 therein may be voided by a suitable pipe 43 tapped into a single opening 44 in the annular wall 28 of cup 26. As in the first embodiment, the membrane unit 13 serves as one wall of the receiving or exhaust space 42 on the downstream side thereof. Otherwise, the cup is imperforate, so that gas exhausted therethrough may be led to a storage container or a place of safe disposal through pipe 43.

The functioning of the device 10 in use is believed entirely obvious from the foregoing description. Plenum chamber 15 ahead of metering element 21 smooths out pulsations at the intake, and the quantity of flow may be calculated from the relationship of pressure therein, orifice size and time of operation. The violent and continuing expansion of the gas leaving metering orifice 23 across the flat disk-like face of element 21, and the expansion ratio as well as other factors may be varied as desired by employing tubular metering elements 21 having orifices 23 of different gauge, results in sufficient turbulence being set up in expansion chamber 25 to cause the less perfect gases, such as oil vapor, to undergo a change of state and become liquid. Entrained globules are then deposited in a wide distribution across the exposed surface of the gas-permeable paper 33. Dust and other foreign matter in the gas may assume a more definite pattern on the membrane; but whatever the character of the deposit may be, it represents an unadulterated reflection of the existing condition of the gas as confined in chamber 25. The membrane 33 is available for removal almost instantaneously by manipulation of the clamping means described above.

Visual inspection will of course reveal any deposit, whether of liquid or solid material, which differs in color or shade from the membrane. In this connection, quantitative measurements as to the entrained material are obtained by weighing and/or extraction methods. As stated, the approximate volume of air or other gas passed by the device may be ascertained by the use of the interchangeable metering elements 21, all standard as to their fit in plug 20, and by reading off head pressure on gauge 18 and noting the time of exposure of the membrane 33. A more accurate measurement of the volume of air may of course be obtained by any appropriate direct metering method, for example, by direct measurement of the exhaust gas from the device.

The utility of instrument 10 as a component of a pneumatic tool or a compressed air tank supplying the same has been mentioned above, hence, it is thus seen that the device has a positive adaptability in addition to its objective utility.

What we claim as our invention is:

A device for gaging a gas as to matter entrained therein, comprising a housing constituted by a pair of releasably engaged hollow housing members, one of which members partially defines an expansion chamber of substantial volume provided with an intake plenum member adapted to receive said gas and having a pressure gauge in communication with its interior, the other housing member partially defining an exhaust space, means providing a metering orifice of restricted flow capacity communicating the interior of said plenum member with said expansion chamber, a gas-permeable membrane having means supporting the same in exposed relation to said expansion chamber between the latter and said exhaust space, so as to be penetrated by gas expanding in the expansion chamber, said supporting means including a perforated plate against which said membrane rests, said plate being releasably clamped between said housing members to enable quick removal of said membrane for inspection.

References Cited in the file of this patent

UNITED STATES PATENTS

| 1,517,144 | Anderson | Nov. 25, 1924 |
| 1,945,660 | Scott | Feb. 6, 1934 |
| 2,076,554 | Drinker et al. | Apr. 13, 1937 |
| 2,536,406 | Wilborn | Jan. 2, 1951 |
| 2,566,307 | Boyle | Sept. 4, 1951 |
| 2,654,242 | Fallgatter et al. | Oct. 6, 1953 |
| 2,791,901 | Rich | May 14, 1957 |